June 13, 1961    J. L. SHERMAN    2,987,865
MOUNTING FOR CROP TOPPING MECHANISM
Filed July 27, 1959    3 Sheets-Sheet 1

INVENTOR.
JOSEPH L. SHERMAN
BY
Charles H. Redman

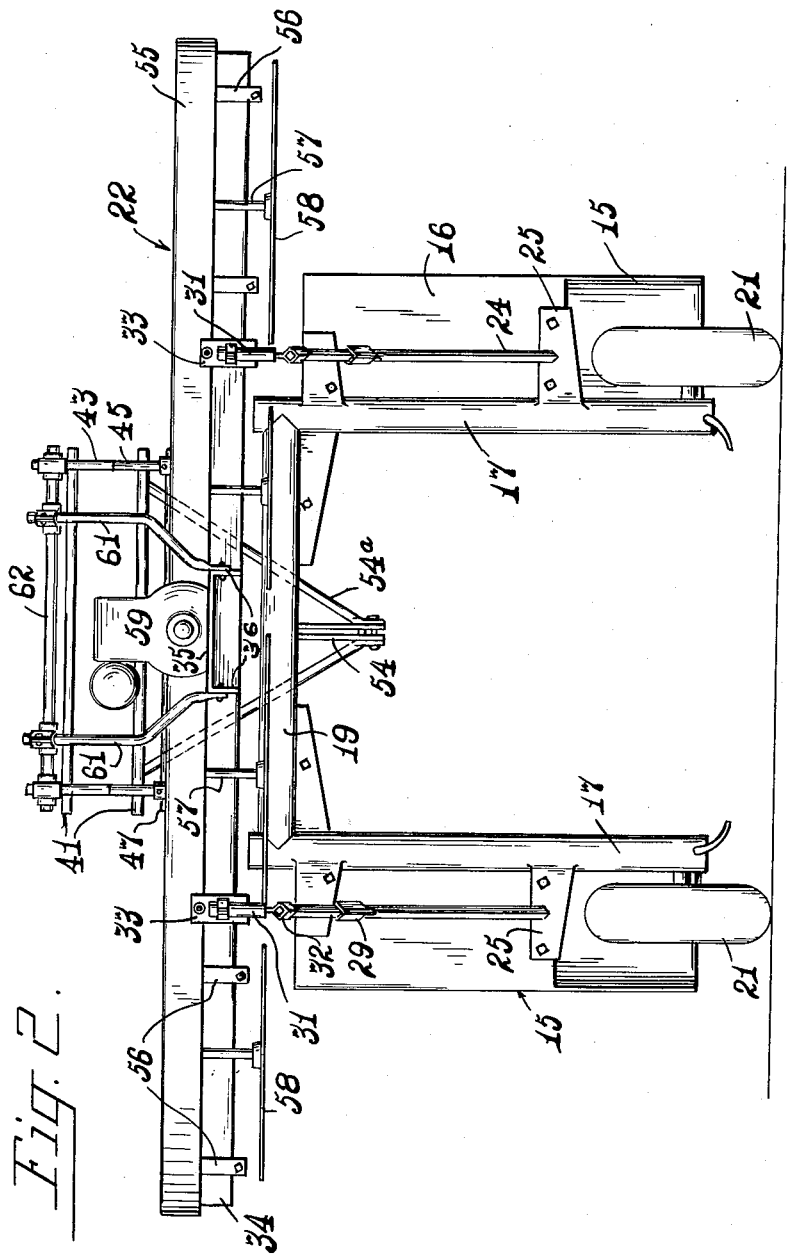

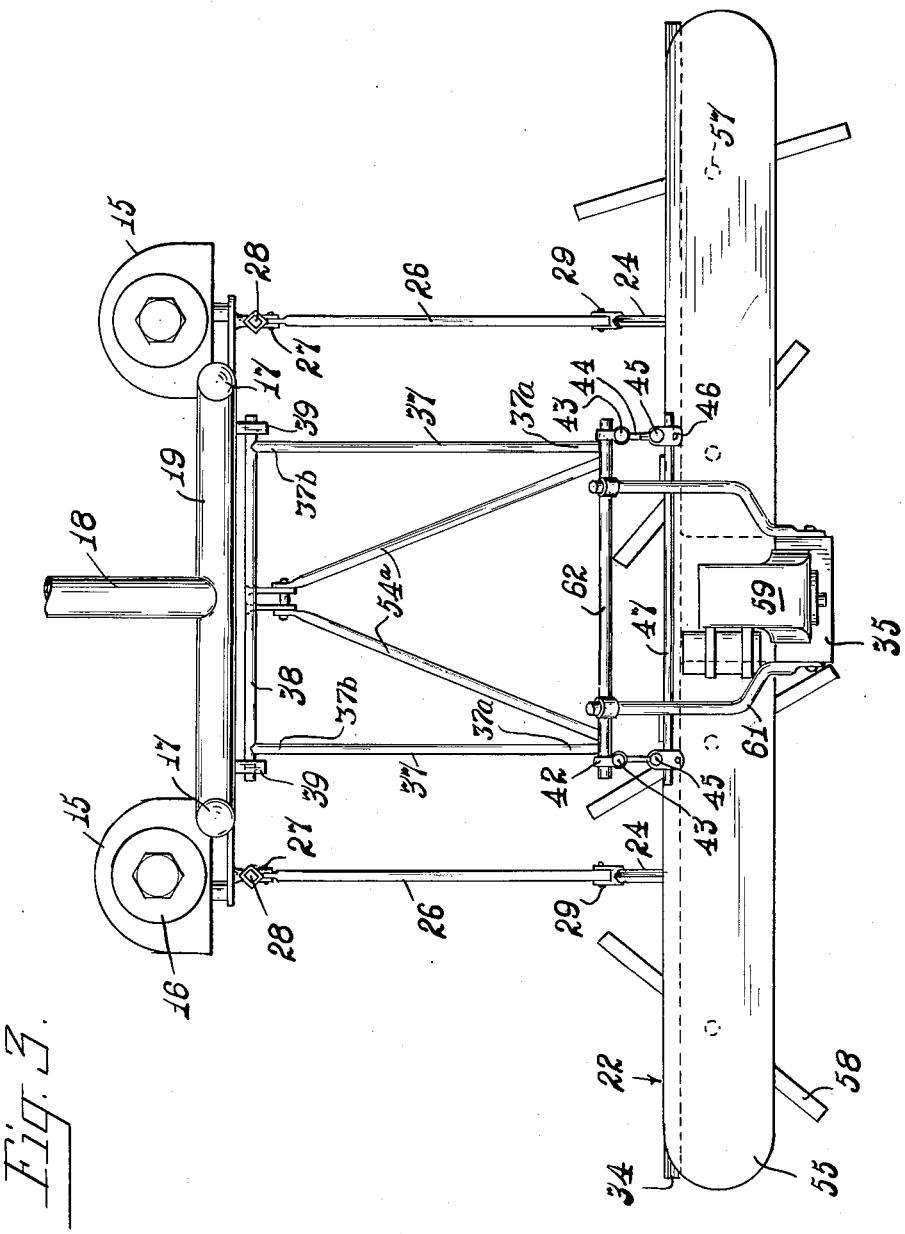

United States Patent Office 2,987,865
Patented June 13, 1961

2,987,865
MOUNTING FOR CROP TOPPING MECHANISM
Joseph L. Sherman, Somonauk, Ill.
Filed July 27, 1959, Ser. No. 829,755
8 Claims. (Cl. 56—25.4)

The invention relates to improvements in farm machinery and is particularly concerned with a novel boom structure for supporting power driven top cutting mechanism rearwardly of the machine and at a distance sufficient to insure proper working of tall crops, such as corn.

The representative piece of farm equipment selected for purposes of illustration is of a character that is used primarily for crop control and it comprises a wheeled vehicle having a power source therein and various tanks to contain water for crop washing and/or insecticides and liquid fertilizer, either or all of which are distributed by means of spray attachments normal with such equipment. In the instant disclosure, the vehicle is provided with a novel trailing boom arrangement primarily intended to afford a mounting for corn topping mechanism. The cropping or cutting off of the tops of corn is for the purposes of lowering the height of stalks to reduce wind resistance and thereby minimize storm damage, of hastening drying by eliminating the upper shade portions of the stalks above the top ear level, and of avoiding clogging of the corn picking machine by cutting away the unnecessary parts of each stalk. To be fully efficient, the topping mechanism must be located sufficiently rearwardly of the rear wheels of the machine to permit the corn to return to standing position after having been temporarily flattened by the wheels of the vehicle. The apparatus disclosed herein and involving the invention is particularly designed to afford the requisite clearance for the tallest corn and also to be raised and lowered automatically for height adjustment.

It is therefore an object of the invention to provide a machine of the character referred to with a novel boom arrangement for supporting topping or cropping equipment in such manner as to insure proper treatment of tall crops.

Another object is to provide a novel boom structure.

Another object is to provide novel means for adjusting the height of the boom structure automatically.

Another object is to provide mechanism of the character described that is not expensive to manufacture, is simple to operate and very efficient in its use.

The structure by means of which the above noted and other advantages of the invention are attained will be described in the following specification, taken in conjunction with the accompanying drawings, showing a preferred illustrative embodiment of the invention, in which:

FIG. 1 is a side elevational view of a farm vehicle having topping apparatus mounted therein in the manner taught by the invention.

FIG. 2 is a back end view of the vehicle and apparatus shown in FIG. 1, omitting the front portion of the vehicle.

FIG. 3 is a top plane view of the rear end portion of the vehicle and apparatus.

The representative vehicle illustrated in the accompanying drawing is a self-propelled piece of farm equipment of a character which includes a front end section 11 housing an internal combustion engine (not shown). The front end section is supported on a single steerable wheel 12 (see FIG. 1) operably connected by any suitable drive means to the internal combustion engine so as to afford drive means for the equipment. Wheel 12 may be steered in the usual manner by manipulation of a steering wheel 13 by an operator seated on seat 14. In the disclosure, the equipment includes a pair of rear end sections 15 that are spaced rearwardly of front end section 11 and are spaced apart laterally as best shown in FIG. 2. Each rear end section 15 includes a tank 16 adapted to contain any spray solution and each has integrally associated with it a vertical column or cylinder 17 adapted to contain water for crop washing. The front end section 11 and the laterally spaced rear end sections 15 are interconnected rigidly by means of a suitable tubular bridge structure comprised of a tubular portion 18 extending rearwardly from front end section 11 and a lateral portion 19 joined intermediate its ends to the rearmost end of portion 18 and at its free ends one to each column 17. The portion 18 is used as a container for fuel for the internal combustion engine. Also, the tubular bridge structure 18—19 is, as shown, located at the upper extremities of front end section 11 and rear end sections 15. Each section 15 is supported by a wheel 21, thus providing a three-wheeled vehicle wherein the back wheels 21 are spaced apart a considerable distance and are adapted to track one on each side of steerable wheel 12.

In use, the vehicle is driven through a field of crop, in the present instance standing corn requiring the cutting off of the tops thereof. This results in both wheels 21 passing between rows with the result that the corn between or adjacent to the wheels is temporarily bent over by the topping machine. As soon as the advancing machine clears the corn flattened thereby, said corn will spring back into upstanding position. Obviously, were the topping equipment, now to be described, too close to the rear end of the machine, the corn which had been flattened would not have cleared the rear wheels or the rear end sections sufficiently in advance of the topping mechanism as to have returned to the upstanding position requisite for proper operation of the topping mechanism.

Referring again to the drawings, the topping mechanism, generally shown at 22, is carried on the rearmost end of a novel boom structure 23 (FIG. 1). This structure comprises a pair of laterally spaced, rearwardly extending supporting arms 24, each pivotally connected at its forward end (as at 24a) to an associated rear end section 15, as for example to a hinge plate 25 rigidly mounted on said section adjacent its lower end. Suspension or stabilizing rods 26 therefor are pivotally connected at their corresponding forward ends, as at 27a, to said associated rear end section, such connection illustratively being through a clamp bracket 27 that is carried by and is vertically slidable on a fixed guide member 28 on said end section. The rearward, free ends of the stabilizing rods 26 are each pivotally connected to a supporting arm 24 by pivot means shown to comprise a connecting pivot 30 carried by a clamp bracket 29 which is slidable along said arm but whose position therealong may be fixed, thereby to provide suspension for its associated supporting arm in any desired angular position of the latter. The arm-rod assembly 24—26 is such that it may be pivotally adjusted vertically into and locked in positions substantially as indicated in full and dotted lines in FIG. 1 and into any intermediate position as may be determined by the height of the corn to be topped. The means for adjusting the arm-rod assembly will be discussed presently.

The free ends of arms 24 each mounts an upright bracket 31 pivotally connected thereto, as by means of a clamp bracket 32 slideable on said arm, to which said upright bracket is pivotally connected as at 32a. As best seen in FIG. 2, each of said upright brackets 31 mounts a clamp bracket 33 to which is secured firmly a transverse beam 34 of such length as to project laterally beyond the width of the vehicle. This beam comprises the sole mounting and support for the topping mechanism 22 and it has, extending rearwardly from its rearmost face, a centrally located substantially rectangular platform 35 including depending reinforcing side flanges 36.

As will be better understood as the description proceeds, the top surface of beam 34 and its platform 35 must lie in a plane substantially parallel to the plane of the ground surface irrespective of its position of elevation. Accordingly, the means to adjust the arm-rod assembly 24—26 and raise and lower beam 34 includes a parallelogram structure comprised of two laterally spaced pairs of links 37, the respective forward ends 37a of which are connected in pairs by vertically spaced horizontal cross rods 38 (only one shown) pivotally mounted at their ends in rigid supports 39 carried on the tubular bridge structure 18—19 (see FIG. 3). The rear ends 37b of the links 37 of one pair are each rigidly connected to the rear ends of the companion links of the other pair by parallel cross bars 41 both of which are pivotally mounted, i.e. journaled, in clamp 42 connected to laterally spaced uprights 43.

Uprights 43 are welded or otherwise secured one to each of a pair of plates 44 that project forwardly from integrally connected posts 45, the lower ends of which are secured, as by clamps 46 (FIG. 3) to a laterally extending rod 47 arranged parallel to and above beam 34 to which it is connected by rigid arms 48 (FIG. 1) extending upwardly from the beam.

The parallelogram structure just described operates to maintain the beam in the required planular position. Vertical adjustment of the boom assembly preferably is controlled through operation of a piston-cylinder assembly 49 which obtains its motivating power from any suitable source such as, for example, an air compression chamber or a hydraulic source (not shown) having its compressive force delivered from a compressor or a pump (not shown) driven by the internal combustion engine. The cylinder 51 of said assembly 49 is connected at its closed end to a bracket 52 (FIG. 1) carried by tubular portion 18 and the operating piston has its rod 53 pivotally connected as at 53a to a crank arm 54 extending from and rigidly connected to lower cross rod 38 of the aforesaid parallelogram structure. The arm 54 may be braced by diagonally extending rods 54a welded thereto and which are connected at their rear ends 54b to the lower one of the cross bars 41.

When the piston rod is retracted into its cylinder, the arm 54 is rocked forwardly to rotate cross rods 38 in a counterclockwise direction thus lowering parallelogram link assembly 37 and the topping mechanism 22 carried thereby. When the piston rod is projected, said link assembly 37 is raised to elevate the mechanism 22. The assembly may be secured in any position of vertical elevation upon securing the clamp brackets 29 and 32 against free sliding on arms 24.

The topping mechanism is conventional and it includes a housing 55 that is secured firmly, as by brackets 56, to beam 34. The housing has depending through its bottom wall a plurality of driven shafts 57 each carrying a blade 58. The blades are in a common plane and each is of a length to be slightly spaced from an adjacent blade so as to provide a relatively wide area of effective operation. Shafts 57 are interconnected with common drive mechanism (not shown) contained within housing 55 which receives its motivation power from motor 59 mounted on the housing and preferably supported by beam platform 35 which may be imparted the requisite rigidity by means of brace bars 61 extending therefrom upwardly and secured to tie rod 62 extending between the upper extremities of uprights 43.

The boom assembly is such that it may be raised or lowered as required by the height of the corn and when in its uppermost of elevation, the topping blades 58 are sufficiently elevated to cut off the tops of fully grown corn. Because of the distance of the topping blades rearwardly of the rear wheels, any corn momentarily flattened by the vehicle will return to upstanding position prior to the topping mechanism moving into position thereover.

Although I have described a preferred embodiment of my invention in considerable detail, it will be understood that the description thereof is intended to be illustrative, rather than restrictive, as many details of the structure shown may be modified or changed without departing from the spirit or scope of the invention. Accordingly, I do not desired to be restricted to the exact construction described.

What I claim and desire to secure by Letters Patent of the United States is:

1. In combination with a vehicle of a type having a wheeled front end section and two laterally spaced apart wheeled rear end sections, a mounting for crop topping mechanism connected to and extending rearwardly of said vehicle, said mounting including a beam to which said topping mechanism is secured, arms extending rearwardly of the rear end sections and supporting said beam at their rearmost ends, said arms being pivotally connected to the beam and one to each rear end section for movement through a vertical arc in accordance with raising and lowering movement of the beam, parallelogram link mechanism connecting the beam to said rear end sections for maintaining the beam in common planular position irrespective of its position of elevation, piston means operatively connected to said link mechanism for moving same in a vertical arc, and suspension-rods pivotally connected at their one ends to the respective arms and at their other ends to the respective rear end sections for supporting the arms in a selected position of adjustment, the pivotal connections between the rods and arms being adjustable in longitudinal direction along said arms.

2. In combination with a vehicle of a type having a wheeled front end section and two laterally spaced apart wheeled rear end sections, a mounting for crop topping mechanism connected to and extending rearwardly of said vehicle, said mounting including a transverse beam to which said topping mechanism is secured, arms extending rearwardly of the vehicle and supporting said beam, said arms being pivotally connected at their forward ends to the beam and at their other ends one to each rear end section, parallelogram link mechanisms lying in vertical planes and connecting the beam to said rear end sections for maintaining the beam in common planular position irrespective of its position of elevation, means operatively connected and arranged so as to move said link mechanisms and the arms through a vertical arc for raising and lowering the beam, and means extending between and operatively connecting said link mechanisms and said arms adapted to secure the beam in a selected position of adjustment.

3. In combination with a vehicle of a type having a wheeled front end section and two laterally spaced apart wheeled rear end sections, a mounting for crop topping mechanism connected to and extending rearwardly of said vehicle, said mounting including a horizontal beam to which said topping mechanism is secured, arms extending rearwardly of the vehicle and supporting said beam, said arms being pivotally connected at their rearward ends to the beam and at their other ends pivotally one to each rear end section for movement through a vertical arc, suspension rods one connecting each arm intermediate its ends and its associated rear end section to support the arms in a selected position of adjustment, and means including a parallelogram link mechanism operatively connected to said beam for elevating and lowering said beam and for maintaining the beam in common planular position irrespective of its position of elevation.

4. In combination with a vehicle of a type having a wheeled front end section and two laterally spaced apart wheeled rear end sections, a mounting for crop topping mechanism connected to and extending rearwardly of said vehicle, said mounting including a beam extending transversely of the vehicle and to which said topping mechanism is secured, arms supporting said beam, said arms being pivotally connected at their rearward ends to the beam and at their other ends one to each rear end section for movement through vertical arcs, parallelogram link mechanism connecting the beam to said rear end sections for maintaining the beam in common planular position irrespective of its position of elevation, means operable through said parallelogram link mechanism to raise and lower said beam, and means to secure said arms in selected positions of elevation corresponding to that of the elevation of said beam.

5. In combination with a power operated vehicle of a type having a wheeled front end section and two laterally spaced apart wheeled rear end sections, a mounting for crop topping mechanism connected to and extending rearwardly of said vehicle, said mounting including a beam to which said topping mechanism is secured, arms supporting said beam from beneath, said arms being pivotally connected at their rearward ends to the beam and at their forward ends one to each rear end section for movement through vertical arcs to raise and lower the beam, a suspension rod connecting each said arm to its respective rear end section, parallelogram link mechanism connecting the beam to said rear sections for maintaining the beam in common planular position irrespective of its position of elevation, and piston means operatively connected to said beam via said link mechanism for actuating the beam to a selected position of elevation.

6. In an apparatus of the character described including a power propelled machine and crop topping mechanism, a support structure pivotally connected to and extending rearwardly of said machine, a transverse beam pivotally mounted on the free end of said support structure and supporting said topping mechanism, said support structure being movable in a vertical arc in accordance with raising and lowering of the beam, a parallelogram link structure operably connecting the beam with the machine, and means operable to swing the parallelogram link structure through a vertical arc to raise and lower the beam and the topping mechanism, said link structure maintaining the topping mechanism in a horizontal plane.

7. In an apparatus of the character described including a wheeled machine and crop topping mechanism, a pair of support arms pivotally mounted on a horizontal axis at one of their ends to and extending rearwardly of said machine, a beam mounted on and pivotally connected to the free ends of said arms and bridging said arms, said beam supporting said topping mechanism, a pair of parallelogram link structures operably connecting the beam with the machine, and power means connected to said machine and said parallel link structures and operative both to swing the parallelogram link structures through a vertical arc and to raise and lower the arms so as to locate the topping mechanism at selected elevations.

8. In an apparatus of the character described including a power operated machine and crop topping mechanism, support arms pivotally connected at their forward ends to and extending rearwardly of said machine, a beam extending between said arms and mounted on the free ends thereof, said beam supporting said topping mechanism, a parallelogram link structure operably connecting the beam with the machine, and means mounted on said machine and connected to said parallelogram link structure for swinging the parallelogram link structure through a vertical arc thereby to raise and lower both said supporting arms and said beam.

References Cited in the file of this patent
UNITED STATES PATENTS

| | | |
|---|---|---|
| 2,492,962 | Bohmker et al. | Jan. 3, 1950 |
| 2,505,952 | Fergason | May 2, 1950 |
| 2,648,943 | Shafer et al. | Aug. 18, 1953 |
| 2,769,295 | Northcote | Nov. 6, 1956 |
| 2,842,926 | Nelson | July 15, 1958 |